United States Patent
Ballantyne

(10) Patent No.: US 11,789,891 B2
(45) Date of Patent: Oct. 17, 2023

(54) MULTI-DEVICE READ PROTOCOL USING A SINGLE DEVICE GROUP READ COMMAND

(71) Applicant: Intel Corporation, Santa Clara, CA (US)

(72) Inventor: Wayne Ballantyne, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 17/217,954

(22) Filed: Mar. 30, 2021

(65) Prior Publication Data

US 2021/0216494 A1    Jul. 15, 2021

Related U.S. Application Data

(60) Provisional application No. 63/008,309, filed on Apr. 10, 2020.

(51) Int. Cl.
| | |
|---|---|
| G06F 3/06 | (2006.01) |
| G06F 15/80 | (2006.01) |
| G06F 13/42 | (2006.01) |
| G06F 9/30 | (2018.01) |
| G06F 13/40 | (2006.01) |
| G06F 13/374 | (2006.01) |

(52) U.S. Cl.
CPC ...... *G06F 13/4282* (2013.01); *G06F 9/30101* (2013.01); *G06F 13/374* (2013.01); *G06F 13/409* (2013.01)

(58) Field of Classification Search
None
See application file for complete search history.

(56) References Cited

U.S. PATENT DOCUMENTS

| 8,407,347 | B2* | 3/2013 | Zhang | G06F 3/1423 |
| | | | | 710/5 |
| 2012/0033244 | A1* | 2/2012 | Kohno | H04N 1/444 |
| | | | | 358/1.14 |
| 2014/0281553 | A1* | 9/2014 | Illion | H04L 51/48 |
| | | | | 713/173 |
| 2018/0113834 | A1* | 4/2018 | O'Shea | G06F 13/4282 |
| 2022/0129378 | A1* | 4/2022 | McJilton | G06F 3/0659 |
| 2023/0169393 | A1* | 6/2023 | Niu | G06N 20/00 |
| | | | | 706/12 |
| 2023/0171731 | A1* | 6/2023 | Abedini | H04W 68/02 |
| | | | | 370/329 |

OTHER PUBLICATIONS

"Draft Specification for RF Front-End Control Interface (RFFESM)," MIPI Alliance, Inc., Dec. 1, 2019, 280 pages.
"Specification for I3C® Improved Inter Integrated Circuit," MIPI Alliance, Inc., Nov. 27, 2019, 480 pages.

* cited by examiner

*Primary Examiner* — Hyun Nam
(74) *Attorney, Agent, or Firm* — Schwabe, Williamson & Wyatt, P.C.

(57) ABSTRACT

Systems, apparatuses, methods, and computer-readable media are provided for managing operations associated with multi-device serial read for communication buses. Embodiments include a protocol controller coupled to a transmitter and receiver assembly of a device to control the transmitter and receiver assembly to perform a multi-device read protocol to read from a plurality of devices coupled to the serial bus using a single device group read command. Other embodiments may be described and/or claimed.

20 Claims, 17 Drawing Sheets

GENERAL 2-WIRE SERIAL BUS SYSTEM

| Field | | Units |
|---|---|---|
| Clock_freq_MHz | 26.0 | MHz |
| Num_devices | 4 | |

| Field | Num_bits | | | Scheme | Total_num_clocks | Total_time(usec) |
|---|---|---|---|---|---|---|
| Preamble | 2 | | | Sequential Read | 100 | 3.85 |
| Sub_ID | 4 | | | Group_read | 49 | 1.88 |
| Command | 4 | | | Savings with Group Read | 51 | 1.96 |
| Register_address | 5 | | | | | |
| Protocol_delay | 2 | | | | | |
| Data_size | 8 | | | | | |

PERFORMANCE TABLE SHOWING ADVANTAGE OF GROUP READ PROTOCOL

FIG. 4

SYSTEM DIAGRAM FOR SERIAL DATA DEVICES
AND INTERCONNECTION BETWEEN A MAIN DEVICE
AND A SUBORDINATE DEVICE

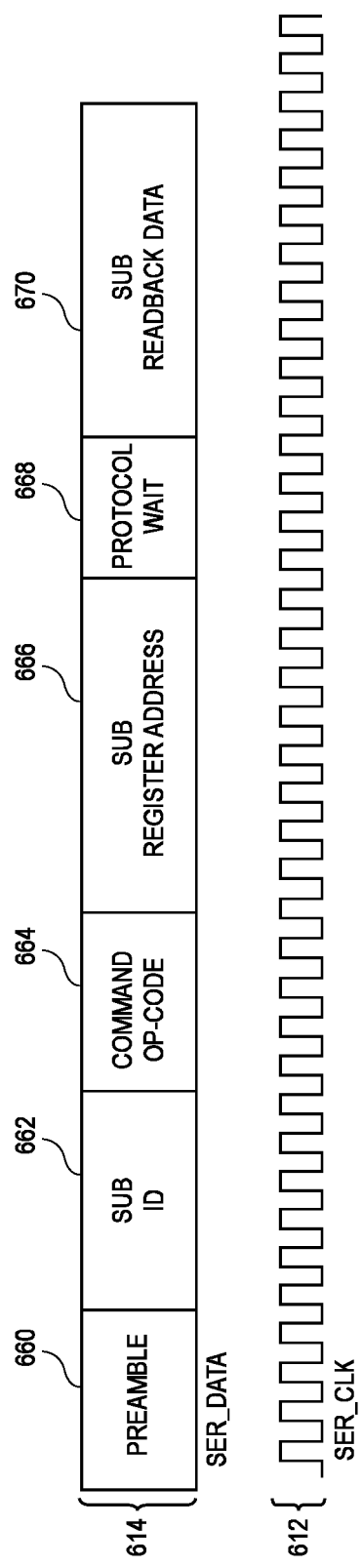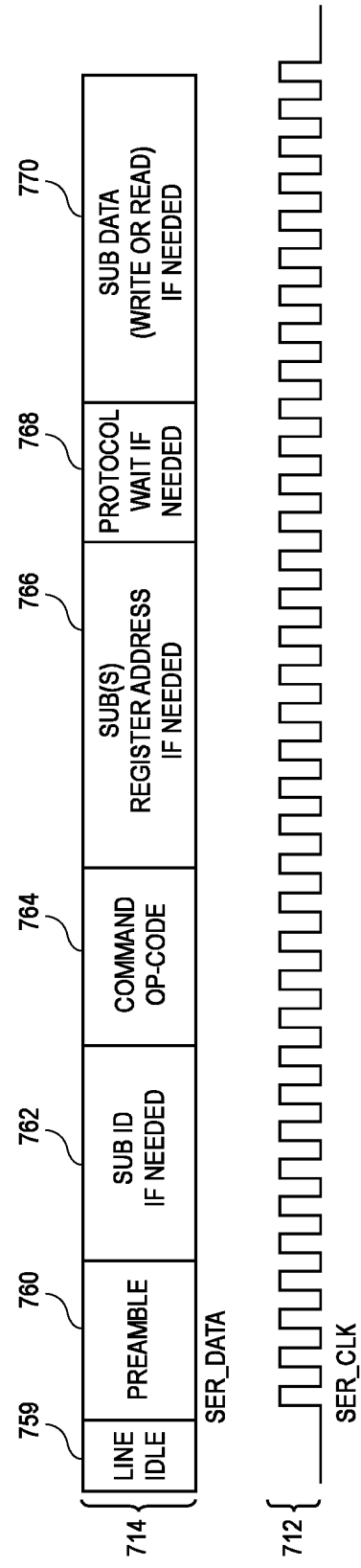

GROUP READ COMMAND APPLIED TO TWO SUB READBACK USE CASE

| REGISTER NAME | RANGE | UNITS | DEFAULT |
|---|---|---|---|
| SUB READBACK TIME SLOT # | 1-15 | # OF TIME SLOTS | SUB ID# |
| SUB READBACK TIME SLOT LENGTH | 1-32 | # OF CLOCKS | DATA WORD SIZE |

REGISTERS TO PROVIDE MORE PRECISE CONTROL OF SUBORDINATE DEVICE READBACK TIME SLOT

FIG. 13

Group Read Readback configuration register

- Defined for every Group Read device
- GSID_read_time_slot:

Group Read Readback configuration registers #2, #3

- Optional for every Group Read device
- Group_read_address_offset:

GROUP READ COMMAND WITH NON-CONSECUTIVE SUB IDs

Group Read Readback alternate proposal based on logical pointer mapping

- Command address bits [7:0] interpreted as address pointer index: example below
- All Group read devices interpret the command address as a pointer

| Field | Pointer value (from bits 7:0 of command address) | Device Address read |
|---|---|---|
| PA Pwr Detector | $01 | Actual pwr detector register address |
| PA Temperature | $02 | Actual PA temp register address |
| Device interrupt | $03 | ISR address |

GROUP READ COMMAND WITH NON-CONSECUTIVE SUB IDs

FIG. 16

Group Read Performance Benefit Table, as applied to MIPI RFFE Protocol

| Baseline Read Command | # of Devices Read | # of Bytes read per device | Cycle Count (# of Devices* Baseline Read Cmd Cycle count) | Cycle Count (Group Read version) and % reduction |
|---|---|---|---|---|
| Register Read | 2 | 1 | 52 | 36 (-31%) |
| Register Read | 4 | 1 | 104 | 56 (-46%) |
| Ext. Register Read | 2 | 1 | 70 | 45 (-36%) |
| Ext. Register Read | 2 | 2 | 88 | 63 (-28%) |
| Ext. Register Read | 4 | 1 | 140 | 65 (-54%) |
| Ext. Register Read | 4 | 2 | 176 | 101 (-43%) |
| Ext. Reg. Read Long | 4 | 1 | 176 | 74 (-58) |
| Ext. Reg. Read Long | 4 | 2 | 212 | 110 (-48%) |

MULTI-DEVICE READ PROTOCOL USING A SINGLE DEVICE GROUP READ COMMAND

RELATED APPLICATION

This application claims priority to U.S. Provisional Application No. 63/008,309 filed Apr. 10, 2020, titled "MULTI-DEVICE SERIAL READ FOR COMMUNICATION BUSES." The specification of this application is hereby incorporated by reference in its entirety.

FIELD

Various embodiments generally may relate to the field of communication and computing, and in particular, may relate to a communication bus or a computer bus and devices coupled by a communication bus or a computer bus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computer system, or a platform, may include many components, such as a host including a central processing unit (CPU), memory, chipsets, and/or many other devices coupled together by a communication bus or a computer bus. A communication bus is a communication system that may transfer data between devices or components inside a computer, or between computers. A computing system or a platform may use various devices coupled to a communication bus extensively. A communication bus may include related hardware components (wire, optical fiber, etc.) and software, including communication protocols. There may be many kinds of communication bus, such as serial buses or parallel buses. A communication bus may be referred to as a computer bus.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 4 illustrates a performance table showing advantage of group read protocol, in accordance with various embodiments.

FIG. 6 illustrates a generalized serial command format, in accordance with various embodiments.

FIG. 7 illustrates a serial command format, in accordance with various embodiments.

FIG. 13 illustrates registers to provide more precise control of subordinate device readback time slot, in accordance with various embodiments.

FIG. 16 illustrates a group read readback alternate proposal based upon logical pointer mapping, in accordance with various embodiments.

FIG. 17 illustrates a group read performance table, in accordance with various embodiments.

DETAILED DESCRIPTION

Figure 1:
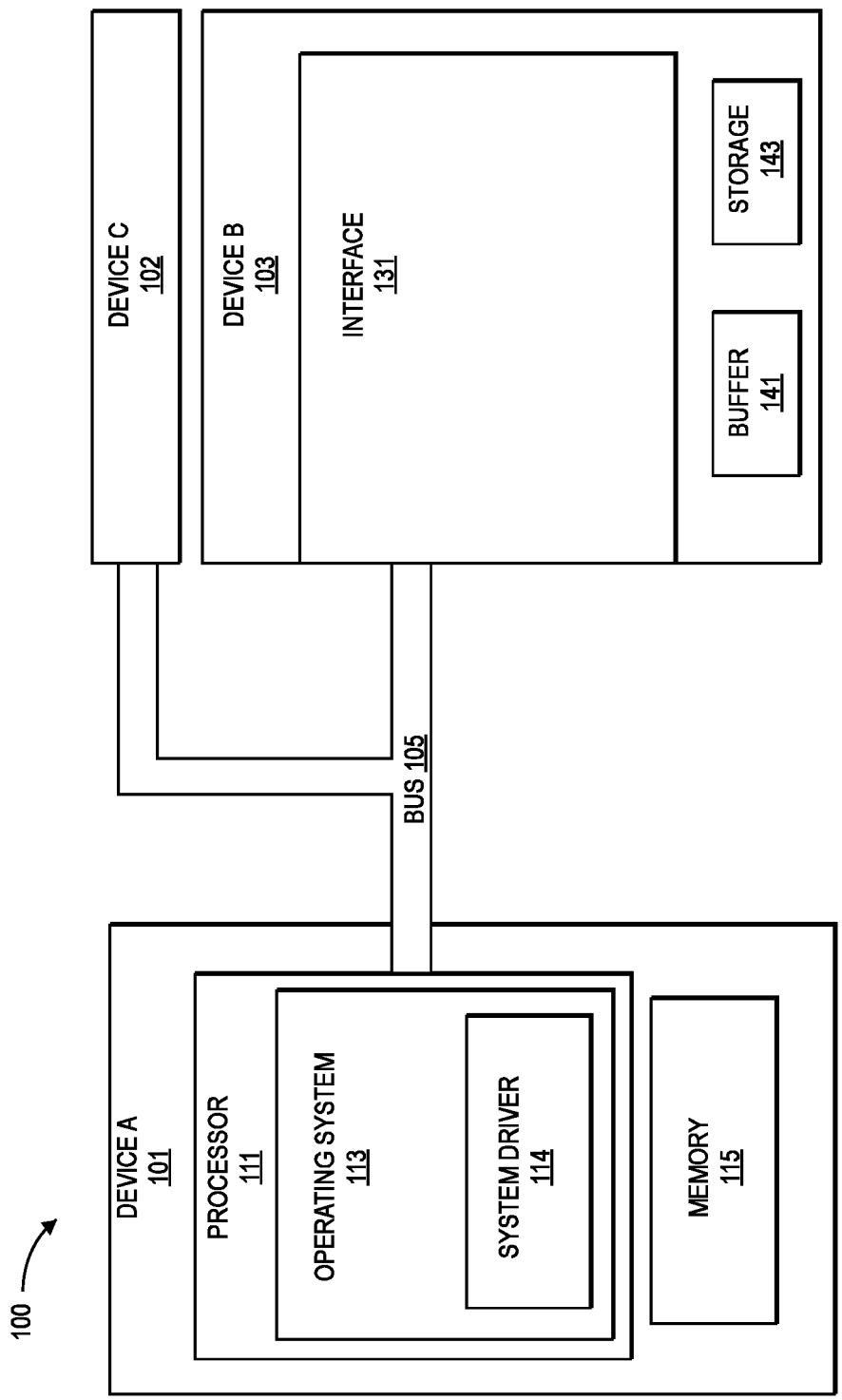
FIG. 1 illustrates an example apparatus including a device coupled to another device by a communication bus, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

A computing system or a platform may use various devices coupled to a communication bus or a computer bus extensively. A communication bus or a computer bus may include related hardware components (wire, optical fiber, etc.) and software, including communication protocols. There may be many kinds of computer buses. For example, a serial peripheral interface (SPI) bus, an improved inter integrated circuit (I3C) bus, a mobile industry processor interface (MIPI) radio-frequency front-end (RFFE) bus, are all examples of a communication bus. In general, a serial data protocol provides a communication link between one device providing a clock and data, and downstream devices that take the clock and data as input.

Presently, serial communication protocols and systems for serial communication buses do not have an efficient read method for quickly reading similar information from multiple devices. For example, in an radio frequency (RF) front end module with multiple beamforming array integrated circuits (ICs), it is desired to periodically read the RF Power Amplifier (PA) temperatures from each IC. With present protocols such as SPI, I2C/I3C, or MIPI RFFE, it is necessary to send individual read commands to each RF device. In some cases, the requesting entity (e.g., transceiver or baseband IC) may not even know if the device is active, leading to a timeout if the addressed device is in fact disabled or in low power mode. The result is that reading multiple serial devices consumes many serial bus cycles.

Embodiments herein provide for a single serial protocol transaction that can read from multiple serial devices. It uses a group subordinate device address and a group read command to allow reading from multiple devices at the same register address. In embodiments, the group read protocol are illustrated as well. As will be discussed in detailed description, each subordinate device only drives data on the bus wire during its allotted time slot. With the proposed group read, total read time is reduced considerably. The numbers of individual transactions on the main device (which reads from the subordinate devices) is reduced. This also contributed to reduced latency.

Various operations will be described as multiple discrete operations, in turn, in a manner that is most helpful in understanding the illustrative embodiments; however, the order of description should not be construed as to imply that these operations are necessarily order dependent. In particular, these operations may not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, programmable state machines, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. The term "RSU" may refer to any transportation infrastructure entity implemented in an gNB/eNB or a stationary (or relatively stationary) UE. An RSU implemented in a UE may be referred to as a "UE-type RSU" and an RSU implemented in an eNB may be referred to as an "eNB-type RSU." As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

As used herein, a "main" device, which formally may have been referred to as a "master" device, may refer to a device that is used to initiate, manage, monitor, or otherwise facilitate communication transfer between various devices on a bus. In addition, a "subordinate" device, which formerly may have been referred to as a "slave" device, may refer to a device that responds to data and/or commands that are sent from a main device. The choice of using "main" or "subordinate" herein is not meant to diminish or to negate any feature or function that is or has been formerly associated with the terms "master" or "slave."

FIG. 1 illustrates an example apparatus 100 including a device 101, e.g., a host, coupled to other devices e.g., a device 102 and a device 103, by a communication bus 105, in accordance with various embodiments. For clarity, features of the apparatus 100, the device 101, the device 102, the device 103, and the communication bus 105, are described below as an example. It is to be understood that there may be more or fewer components included in the apparatus 100, the device 101, the device 102, the device 103, and the communication bus 105. Further, it is to be understood that one or more of the devices and components within the apparatus 100 may include additional and/or varying features from the description below, and may include any device that one having ordinary skill in the art would consider and/or refer to as a host, a device, and a communication bus. In some embodiments, the communication bus 105 may be a serial communication bus, or a serial bus.

In embodiments, the device 101 may include the processor 111 and a memory 115. An operating system 113 may operate on the processor 111, and may include a system driver 114. The device 102 and the device 103 may be coupled to the processor 101 by the communication bus 105. The device 102 and the device 103 may have a same or similar structure. For the description below, details are only provided for the device 103. The device 103 may include an interface 131 coupled to the communication bus 105, a buffer 141, and a storage 143. The interface 131 may include one or more registers, such as a capability header register, an authentication header register, an authentication capability register, an authentication status register, an authentication control register, a write data mailbox register, a read data mailbox register, or some other registers.

In embodiments, the apparatus 100 may be any computing system or platform, for example, a laptop computer, an ultra-laptop computer, a tablet, a touch pad, a portable computer, a handheld computer, a wearable device, a palmtop computer, a personal digital assistant (PDA), an e-reader, a cellular telephone, a combination cellular telephone/PDA, a mobile smart device (e.g., a smart phone, a smart tablet, etc.), a mobile internet device (MID), a mobile messaging device, a mobile data communication device, a mobile media playing device, a camera, a mobile gaming console, etc. In embodiments, the apparatus 100 may also be a non-mobile device that may include, but is not to be limited to, for example, a personal computer (PC), a television, a smart television, a data communication device, a media playing device, a gaming console, a gateway, an Internet of Things (JOT) device, etc. The apparatus 100 may include controllers (or processors) and other components that execute software and/or control hardware to execute local programs or consume services provided by external service providers over a network. For example, the apparatus 100 may include one or more software clients or applications that run locally and/or utilize or access web-based services (e.g., online stores or services, social networking services, etc.). The apparatus 100 may also, or instead, include a web interface running in a browser from which the electronic apparatus can access such web-based services. The apparatus 100 may also include storage devices to store logic and data associated with the programs and services used by the apparatus 100.

In embodiments, the processor 111 may be a central processing unit (CPU). In some embodiments, the processor 111 may be a programmable device that may execute a program, e.g., the system driver 114. In embodiments, the processor 111 may be a microcontroller, a 16-bit processor, a 32-bit processor, a 64-bit processor, a single core processor, a multi-core processor, a digital signal processor, an embedded processor, or any other processor.

In embodiments, the operating system 113 may be any system software that manages hardware or software resources for the apparatus 100, and may provide services to applications, e.g., the system driver 114. The operating system 113 may be Windows®, Android OS, iOS, Linux, a real-time operating system (RTOS), an automotive infotainment operating system, among others. For example, the operating system 113 may be a real-time operating system such as VxWorks, PikeOS, eCos, QNX, MontaVista Linux, RTLinux, Windows CE, or other operating system.

In embodiments, the communication bus 105 may be an external communication bus, an internal communication bus, a serial communication bus, or a parallel communication bus. For example, the communication bus 105 may be a universal serial bus (USB), a parallel advanced technology attachment (PATA) bus, a serial ATA (SATA) bus, an inter-integrated circuit (I2C) bus, a SPI bus, an I3C bus, a MIPI RFFE bus, an IEEE 1394 interface (FireWire) bus, a small computer system interface (SCSI) bus, a scalable coherent interface (SCI) bus, or other communication bus.

In embodiments, the device 103 may be any piece of computer hardware. For example, the device 103 may be a network interface card, an audio card, a video controller, an Ethernet controller, a webcam, mouse, a Bluetooth controller, a GUI Accelerator, an ATM Controller, a multimedia card, a SCSI controller, a multimedia device, a MPEG-II Video Decoder, or any input/output device. In some other embodiments, the device 103 may be coupled to the processor 111 by a different communication bus.

Figure 2:
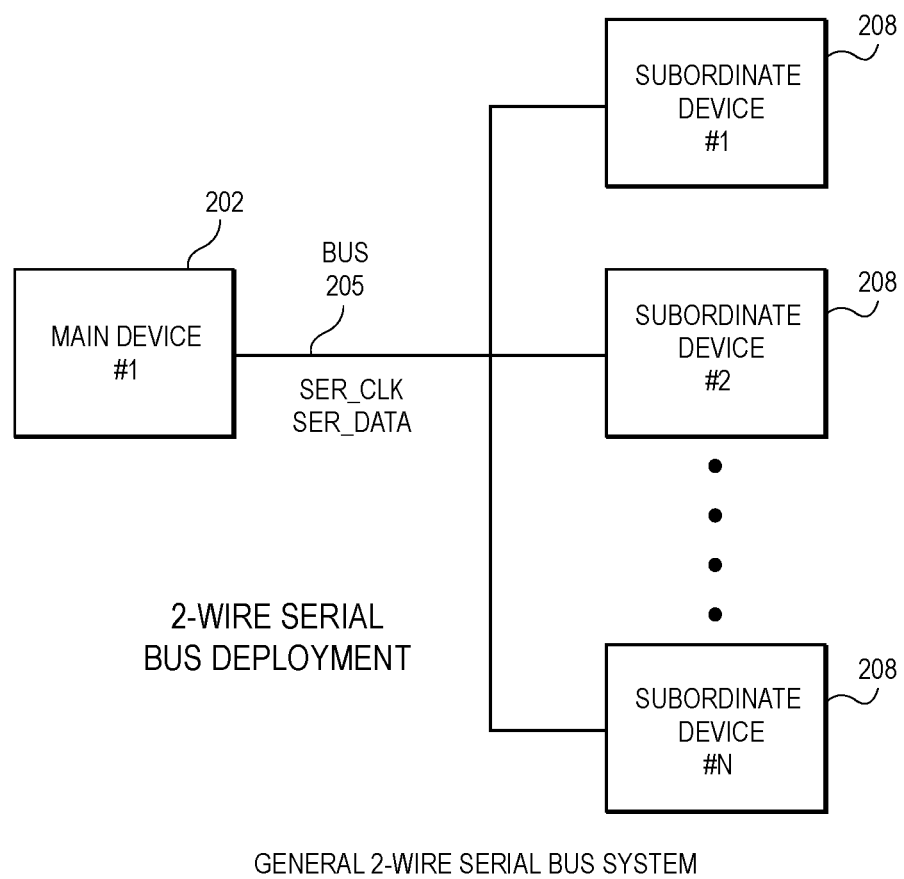
FIG. 2 illustrates an example general 2-wire serial bus system, in accordance with various embodiments.

FIG. 2 illustrates an example general 2-wire serial bus system including one main device 202 coupled to multiple subordinate devices 208 by a communication bus 205, in accordance with various embodiments. The communication bus 205 may be an example of the communication bus 105 as shown in FIG. 1.

For the serial communication protocols and systems shown in FIG. 2, the read method may not be efficient for quickly reading similar information from multiple devices. For example, in an RF front end module with multiple beamforming array ICs, it is desired to periodically read the RF Power Amplifier (PA) temperatures from each IC. With present protocols such as SPI, I3C, or MIPI RFFE, it is necessary to send individual read commands to each RF device. The result is that reading multiple serial devices consumes many serial bus cycles, and can cause bus congestion when the multiple device readouts occur around the time of another event such as TX to RX switching.

In MIPI RFFE, there is a broadcast (group) trigger command which allows multiple devices with a common group address to execute a pre-programmed action at the same time, e.g., transferring data from a shadow register to a functional register. In a sense, this can be thought of as a "group write" for a specific action. The MIPI RFFE group trigger scheme only allows the simultaneous triggering of a transfer from previously written shadow registers in multiple subordinate devices into their destination registers, (which has a functional impact on the subordinate device). It has nothing to do with subordinate device reading.

For reading multiple devices, the brute force method is to read just one device at a time. It seems no existing serial protocol for reading from multiple devices with one command sequence. Reading multiple devices sequentially works, but takes the longest amount of time. Simply speaking, if the # of clocks to read a certain register from a serial device is $K_R$, the time (in serial bus clock cycles) to read from N devices is $T_{READ\_N} >= N*K_R$. (The > sign is because there may be a couple of idle clocks required between sequential serial transactions).

For reading multiple bytes of data from a single serial device, there are extended Read protocols available. For example, MIPI RFFE has an Extended Register Read Command Sequence, where a starting read address is provided for a specific device, as well as byte count to indicate the number of bytes to be read. Extended Read commands increase overall read throughput, but don't perform the same function as reading the same content type from multiple devices in an efficient manner. In many use cases, the main device wants to read a single register value from multiple subordinate devices having the same register format, so Extended Read does not help at all.

In I3C v1.1 specification, there is also a Group Addressing procedure defined, but only for writes. The I3C Group Addressing procedure is defined only for writes. In fact, the specification reads: "The Current Master [Main] can write to a Group Address just as it would any I3C Dynamic Address. However, the Current Master [Main] shall not attempt to read data from I3C Devices using a Group Address."

Figure 3:
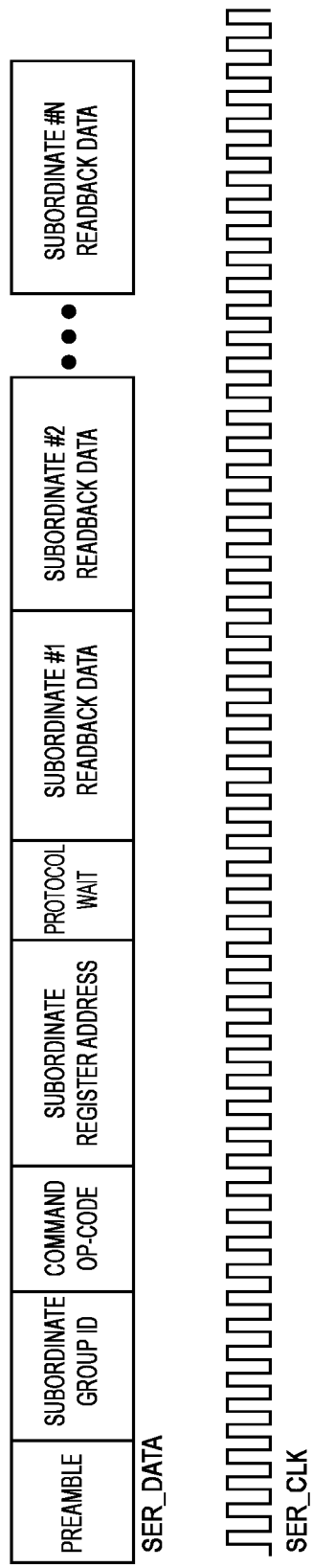
FIG. 3 illustrates an example group serial read protocol, in accordance with various embodiments.

FIG. 3 illustrates an example group serial read protocol, in accordance with various embodiments.

In an embodiment, the group read protocol is shown in FIG. 3. Embodiments herein provide for a single serial protocol transaction that can read from multiple serial devices. It uses a group subordinate address and a group read command to allow reading from multiple devices at the same register address. As will be discussed in detailed description, each subordinate device only drives data on the SER_DATA bus wire during its allotted time slot.

FIG. 4 illustrates a performance table showing advantage of group read protocol, in accordance with various embodiments.

With the group read shown in FIG. 3, total read time is reduced considerably. For example, with four devices, and using MIPI RFFE v3.0 protocol, the total read time can be reduced from 140 to 65 clocks in one scenario. The numbers of individual transactions on the main device (which reads from the subordinate devices) is reduced. This also leads to reduced latency.

Figure 5:
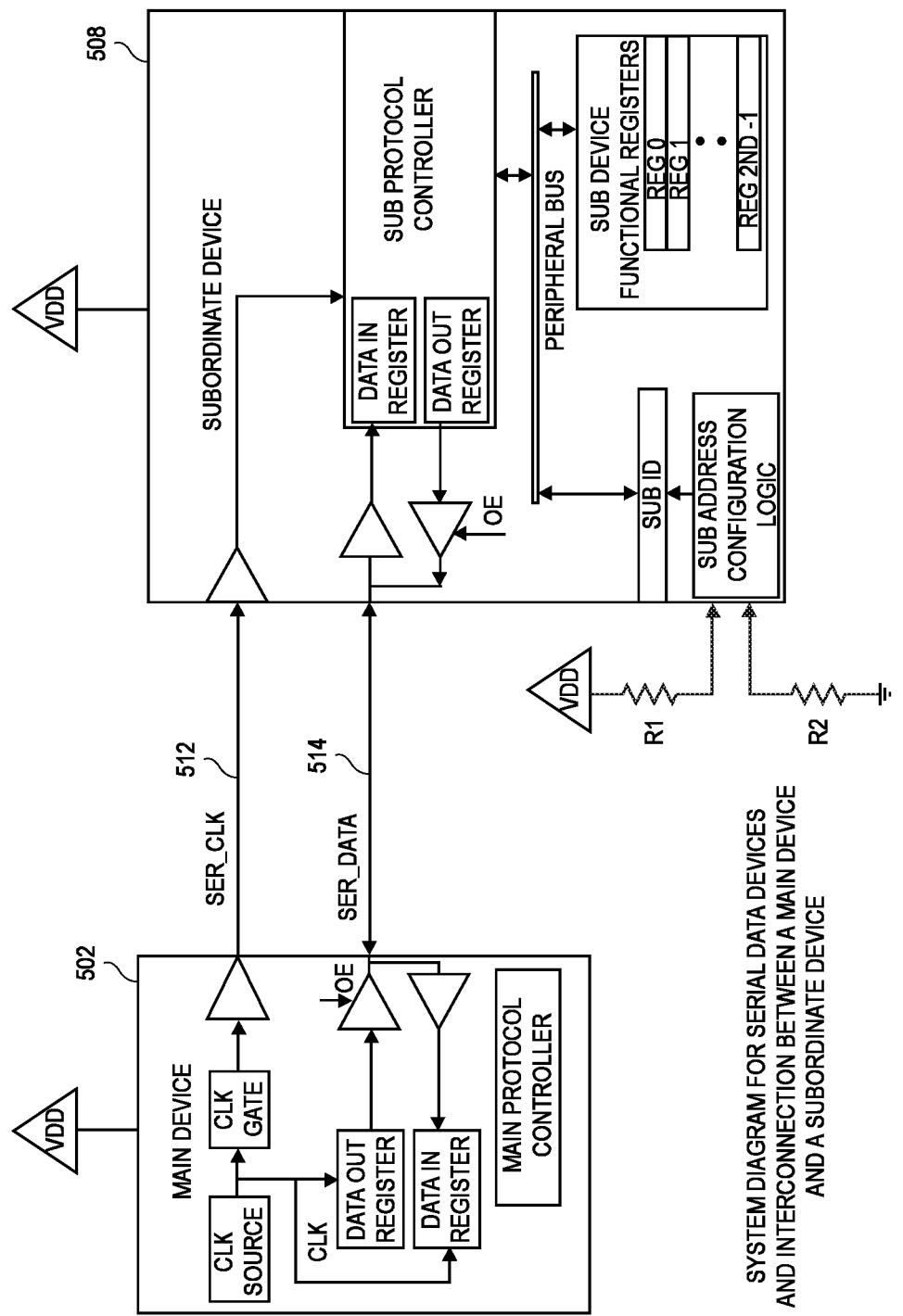
FIG. 5 illustrates a system diagram for serial data devices and interconnection between a main device in a subordinate device, in accordance with various embodiments.

FIG. 5 illustrates a system diagram for serial data devices and interconnection between a main device and a subordinate device, in accordance with various embodiments. The system diagram may be an example of the apparatus 100 shown in FIG. 1.

Generally speaking, a serial data protocol provides a communication link between one device providing a clock and data, and downstream devices that take the clock and data as input. For readback, the downstream devices will temporarily start driving the data line at a prescribed time, using the clock provided by the upstream device. With MIPI RFFE and SPI protocols, one device is typically designated as the main device 502 and the other devices as subordinate devices 508. Embodiments herein adopt this main/subordinate device notation but the concepts presented here can also apply to peer-to-peer serial protocols such as I2C or I3C.

In FIG. 5, a typical Main device 502 block diagram is shown, along with that of a subordinate device 508, and a common interconnect scheme. Multiple subordinate devices can be connected to the same bus, as shown in FIG. 2. Embodiments herein are focused on the main and subordinate detailed architectures and functionality. These will now be discussed in turn.

The main device 502 generates a clock which is driven out the SER_CLK line 512. This clock, or multiples/derivatives of this clock, can also be used for on-chip logic, including the main Protocol Controller.

The main device 502 may also generate data content that would be driven out the (bi-directional) SER_DATA line 514 at the SER_CLK rate. The data rate on SER_DATA 514 could be 2X the clock if DDR mode is used. In some embodiments, DDR mode may not be used but it does not affect the embodiments if used. Generally speaking, the data is usually targeted for a specific subordinate device 508, but some data messages could be targeted for multiple subordinate devices. This would be via a group address or common command protocol. For example, the same data could be written to multiple subordinate devices having the same group address, or they are of the same type, or at least their data destination register has the same function amongst all subordinate devices in the group. In other cases, such as a Soft Reset command, this could be sent to all subordinate devices 508 simultaneously even if they are different device types. The Soft Reset behavior would be different for each subordinate device, but the net result (returning device to a defined initial state) would be the same.

The subordinate device receives data over the SER_DATA line 514, one bit per period of SER_CLK. This data may be loaded into a "Data-in" register, where its content can subsequently be pushed to other functional registers as shown on the lower right of the subordinate device. It is common for these serial data protocols to support an extended Write feature where multiple subordinate device data registers can be written in one transaction.

The subordinate device 508 can also send data back to the main device 512 over the (bi-directional) SER_DATA line 514. In this case, the protocol may ensure that, when the subordinate device 508 drives data back to the main device 502, no other subordinate devices 508, nor the main device 502 itself, are driving data on SER_DATA.

One other feature of this protocol may include the subordinate device 508 address, which may be unique. Each subordinate device 508 may have a unique address in order to receive datagrams targeted just for itself. The subordinate device 508 address can be set via electronic fuse (EFUSE) or one-time programmable (OTP) memory, or as shown in FIG. 5, via pullup/pulldown resistors on dedicated subordinate device 508 address Set inputs. This latter subordinate device address scheme, while adding pins, may avoid the need to proliferate unique subordinate part numbers (P/Ns) consisting of multiple identically functioning devices having different subordinate device addresses set via EFUSE/OTP.

The following provides a detailed protocol discussion.

FIG. 6 illustrates a generalized serial command format. FIG. 6 shows the general structure of serial data protocols, and can be considered as an embodiment. Each data field or line mode will now be discussed.

Line Idle: here, the main device is not sending any commands, and so the clock (SER_CLK) 612 will be idle (high or low). Likewise, the data line SER_DATA will also be constant.

Preamble 660: this indicates to the subordinate devices that a command is about to be sent. It consists of a unique set of levels or transitions on SER_DATA and SER_CLK that would unambiguously signal the start of a command.

Subordinate ID 662: this is the ID of the individual subordinate device being written to, or read from. This could also be a group ID or broadcast ID, in which case the command defined in the next field will apply to multiple devices at once. It is possible that some commands could inherently address all subordinate devices, so that the ID field may not be needed.

Command op-code 664: the device command being sent. Typically this is some sort of read or write command, but could also be a reset command.

Subordinate register address 666: this defines the register address of the subordinate device(s) being written to. In some cases, such as extended addressing mode, it could indicate the starting register address for a subsequent block of data being written to, or read, by the main device.

Protocol wait 668: in some cases, such as a device read, the subordinate device may need a small number of clock cycles before the data to be read is ready.

Subordinate data 670: this is the data being read from the subordinate device (some commands, such as reset, may not need any data).

While in protocols such as MIPI RFFE and I3C, there are broadcast write commands where the same data can be written to multiple devices at once, there is no legacy feature for readback. For example, in section 6.5 of the MIPI RFFE 3.0 spec, which discusses Broadcast messages, states "Only write command sequences shall be sent using a Group Slave ID (GSID) or the Broadcast Slave ID (BSID). Any read command sequence using a GSID or the BSID is prohibited, and shall be ignored by all Slaves since this could result in bus contention issues."

Therefore, in a legacy situation where it is needed to read the same data type (from the same address) from multiple subordinate devices, in a short time period, each subordinate device may be read one at a time. For example, in a MIPI RFFE deployment supporting 4×4 UL multi-input multi-output (MIMO), there will be four RF PAs and it will be necessary to periodically readback the PA temperature and forward power detector value. For example, four separate MIPI read commands, one to each PA, will have to be sent for the temperature, and another for the power detector.

FIG. 7 illustrates a serial command format, in accordance with various embodiments.

FIG. 7 shows embodiments of additional serial data protocols. Each data field or line mode will now be discussed.

Line Idle 759: here, the main device is not sending any commands, and so the clock (SER_CLK) 612 will be idle (high or low). Likewise, the data line SER_DATA 712 may also be constant.

Preamble 760: this indicates to the subordinate devices that a command is about to be sent. In embodiments, it may consist of a unique set of levels or transitions on SER_DATA 714 and/or SER_CLK that would unambiguously signal the start of a command.

Subordinate ID 762: this may include the ID of the individual subordinate device being written to, or read from. This could also be a group ID or broadcast ID, in which case the command defined in the next field will apply to multiple devices at once. It is possible that some commands could inherently address all subordinate devices, so that in embodiments the ID field 762 may not be needed.

Command op-code 764: the device command being sent. Typically this is some sort of read or write command, but could also be a reset command.

Subordinate register address 766: this defines the register address of the subordinate devices(s) being written to. In some cases, such as extended addressing mode, it could indicate the starting register address for a subsequent block of data being written to, or read, by the main device.

Protocol wait 768: in some cases, such as a device read, the subordinate device may need a small number of clock cycles before the data to be read is ready.

Subordinate data 770: this is the data being written to the subordinate device, or read from it. Some commands, such as reset, may not need any data.

Figure 8:
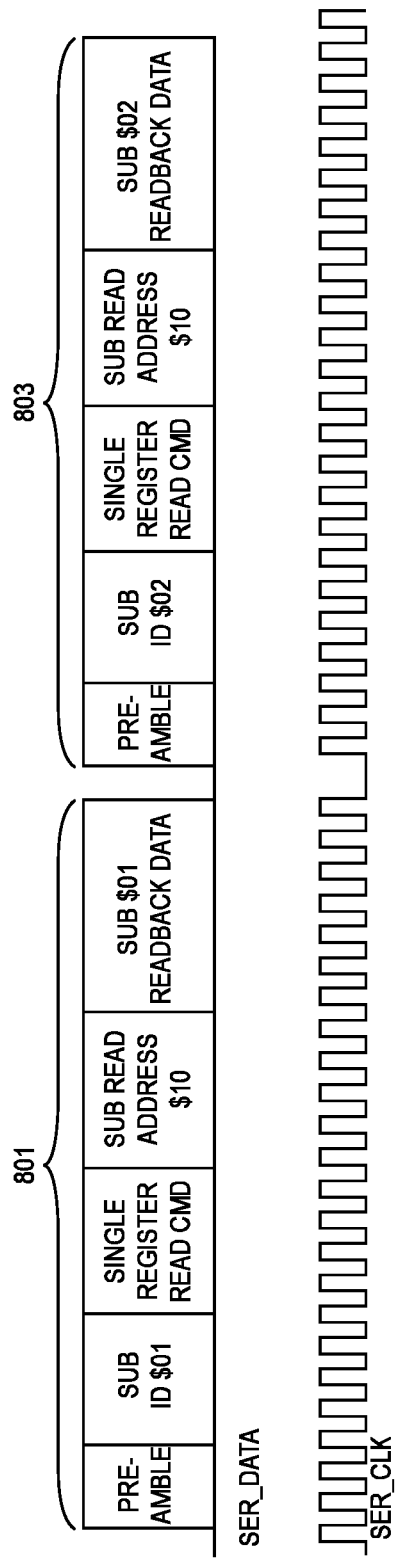
FIG. 8 illustrates a readback of same data type from two subordinate devices in succession, in accordance with various embodiments.

FIG. 8 illustrates a readback of same data type from two subordinate devices in succession, in accordance with various embodiments in the current art. FIG. 8 shows a legacy scenario where two operations 801, 803 are performed to read from two subordinate devices successively, each from the same subordinate device address $10.

In the scenario shown in FIG. 8, in legacy implementations, the subordinate devices are of the same type, e.g., NR band n77 PA. In a 4×4 MIMO deployment, for example, four identical PA devices may be used, which differ only in their subordinate device ID value. In implementations, there may not be a "quad" PA used, as the MIMO antennas need spatial separation and the PA is usually located very close to the antenna to reduce path loss.

In this example, because the subordinate devices are of the same type, then the register address for, say, the PA temperature is the same for all the devices.

Figure 9:
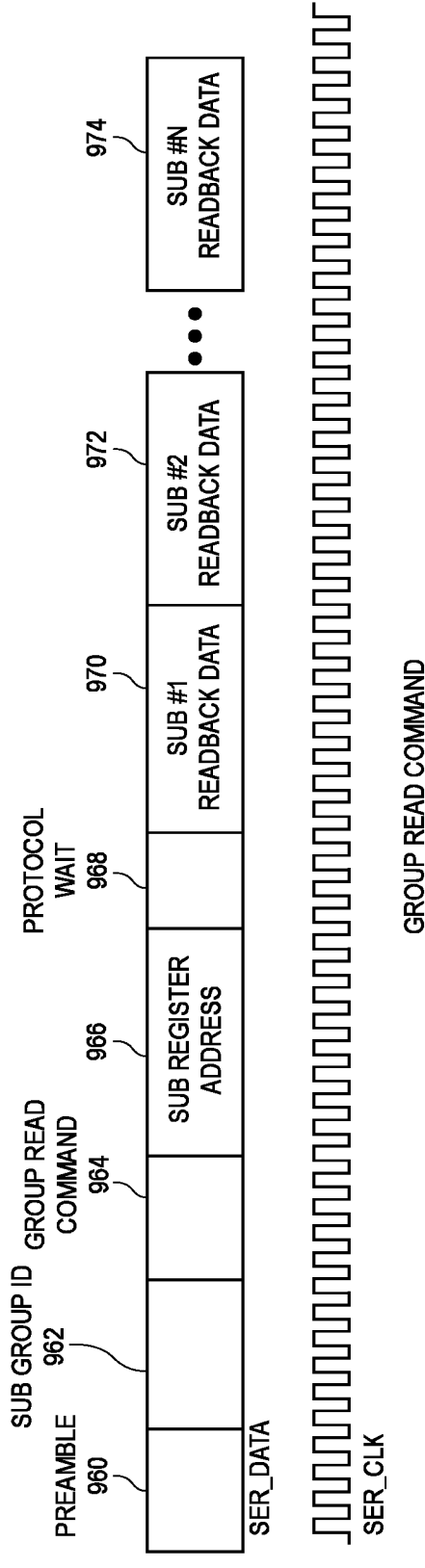
FIG. 9 illustrates a group read command, in accordance with various embodiments.

FIG. 9 illustrates a group read command, in accordance with various embodiments. FIG. 9 introduce an embodiment to avoid the main device having to send successive read commands, embodiments herein present a group read command which allows multiple subordinate devices to be read in succession.

The behavior of the group read command, in one embodiment, is illustrated in FIG. 9. The serial data may include a preamble 960, a subordinate group ID 962, a group read command 964, a subordinate register address 966, a protocol wait 968, and subsidiary device readback 970, 972, 974.

In embodiments, a Group Read command 964 is sent to all the subordinate devices defined by the Subordinate Group ID field 962. For example, in 4×4 MIMO n77 PA example above, all four PAs would belong to the Subordinate Group ID used. After the Group Read command, there follows the subordinate register address 966, which could be, for example, the address of the PA temperature. Following this example, the temperature data is readback in succession, with the order being defined by the order of the subordinate addresses of the subordinate devices in the group. In the example above, it is assumed that the subordinate IDs in the group are consecutive, i.e., subordinate device #1, #2, #3, etc. If there was a gap in the subordinate ID addresses, there would be a gap in the readback data. In embodiments, subordinate IDs may be consecutive.

In embodiments, each subordinate device may assert its Output Enable (OE) signal (see FIG. 5) only during its readback time slot, otherwise there will be contention. Thus, the subordinate devices may include counters to count SER_CLK periods to determine when its readback time slot is present. In embodiments, subordinate devices may determine when to drive their data out on the bi-directional data line based on the specific protocol in use.

Figure 10:
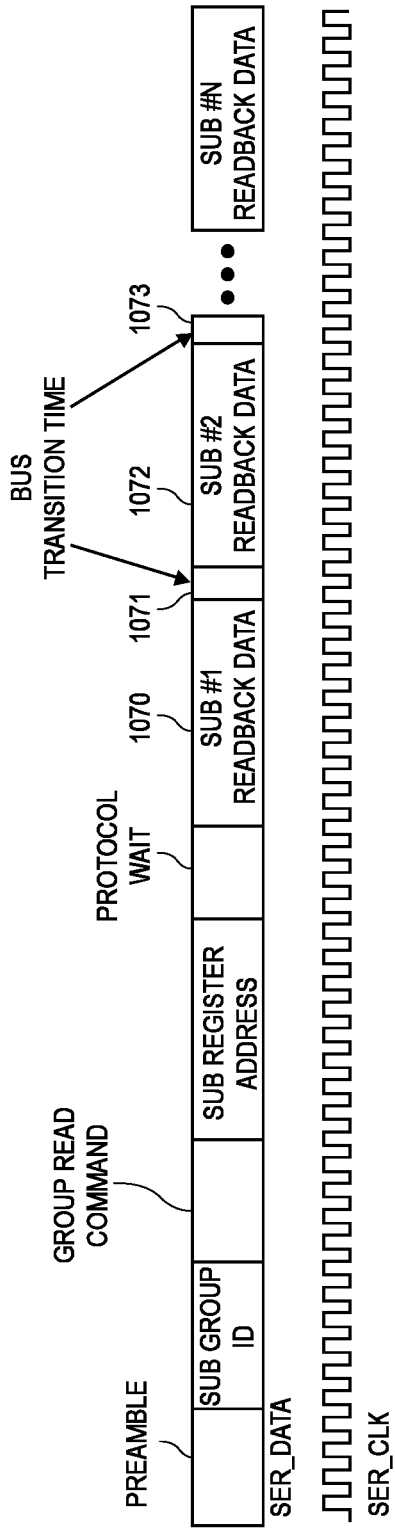
FIG. 10 illustrates a group read command with bus transition times, in accordance with various embodiments.

FIG. 10 illustrates a group read command with bus transition times, in accordance with various embodiments. FIG. 10 may be similar to figure nine above, but with bus transition times 1071, 1073 serving as gaps between the subordinate readback data 1070, 1072, 1073, which may be similar to subordinate readback data 970, 972, 974 of FIG. 9. In embodiments, the gaps may be one or more bit clock periods in length.

Figure 11:
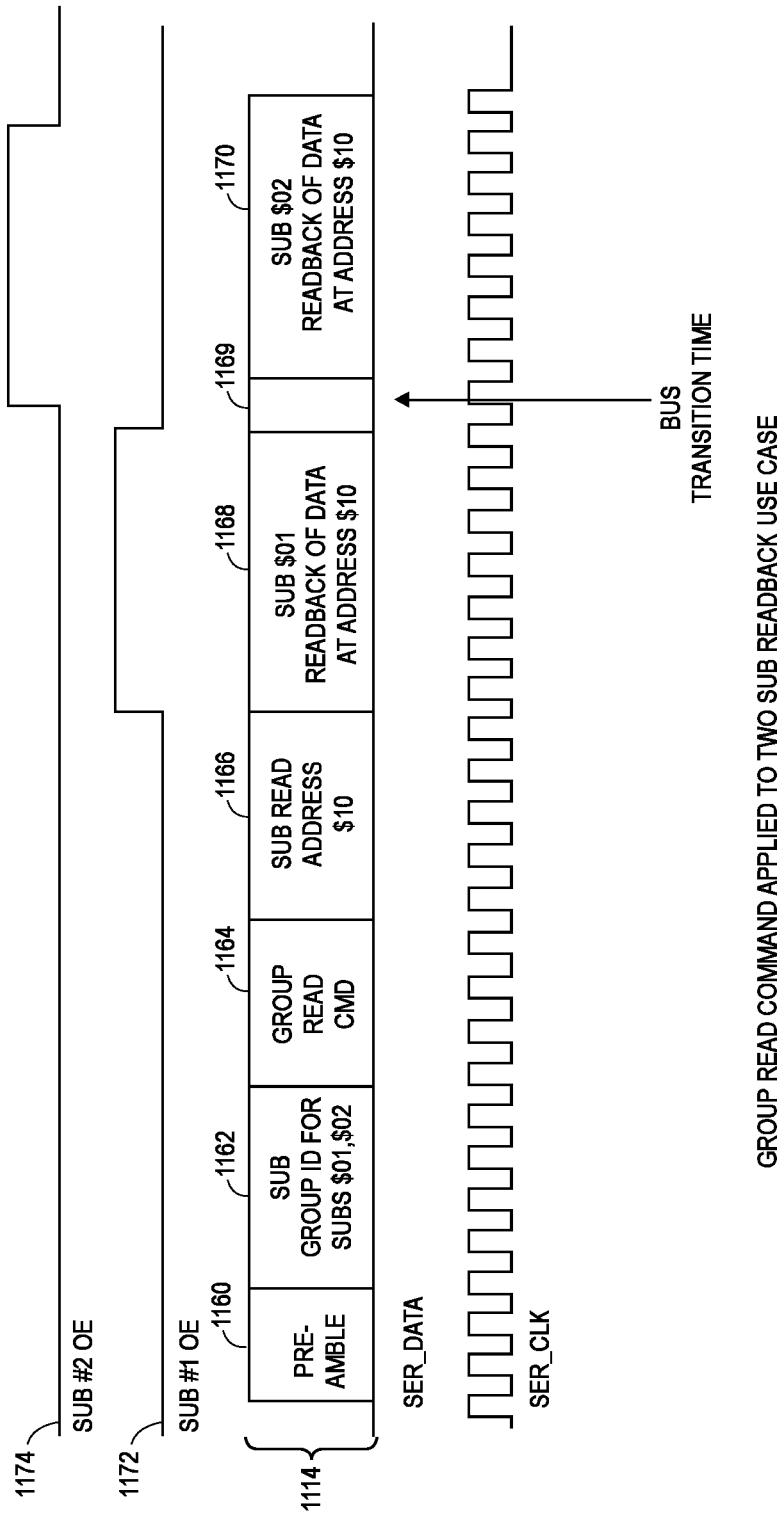
FIG. 11 illustrates a group read command applied to two subordinate device readback use case, in accordance with various embodiments.

FIG. 11 illustrates a group read command applied to two subordinate readback use case, in accordance with various embodiments. FIG. 11 demonstrates an Output Enable (OE) detail. In embodiments, serial data 1114 sequence may include a preamble 1160, a subordinate group ID 1162, a group read command 1164, a subordinate device read address 1166, readback of data 1168, 1170, that may be separated by a bus transition time 1169.

In embodiments, the Subordinate Group ID 1162 may refer to both Subordinate IDs $01 and $02. In embodiments, this could be preconfigured in the subordinate devices or, more likely, configured during device initialization. After the Group Read command and Subordinate Read address of $10 are decoded, the subordinate devices will both read from address $10. For example, these addresses may refer to a PA temperature, but could be anything. Subordinate $01 will then assert its OE 1172 and drive its data on the SER_DATA line 1114. After the proper number of clocks corresponding to the data length associated with subordinate register address $10, subordinate $01 will de-assert its OE 1172 and then subordinate $02 will assert OE 1174 and drive its data on the bus 1114. After its data is read out, subordinate $02 will also de-assert OE 1174 and the whole command will be completed. Implied in this scheme is that subordinate devices $01 and $02 assert readback data on the readback slot # associated with their ID #.

Enhanced forms of the embodiments. Additional embodiments may include the following.

Group extended read mode. In embodiments, this mode allows multiple data registers to be read from multiple subordinate devices, starting with the same base register address. So in that case, FIG. 11 may show readback 1168, 1170 from two or more registers from each subordinate device, starting at the base address shown in subordinate read address field 1166. Also, the Command opcode 1164 may include a field to indicate the number of data registers (per subordinate device) to be readback. In embodiments, all the data may be read from one subordinate device before switching to the next subordinate device, but it would also be possible to read the multiple data words from the subordinate devices in an interleaved manner (not shown).

In other embodiment examples, two subordinate devices #1 and #2, with readback of two data words from each subordinate device, the readback scheme may be, for example: subordinate device #1-Data word 1/subordinate device #1-Data word 2/subordinate device #2-Data word 1/subordinate device #2-Data word 2. In other embodiments, readback could be performed in an interleaved manner, for example: subordinate device #1-Data word 1/subordinate device #2-Data word 1/subordinate device #1-Data word 2/subordinate device #2-Data word 2.

Figure 12:
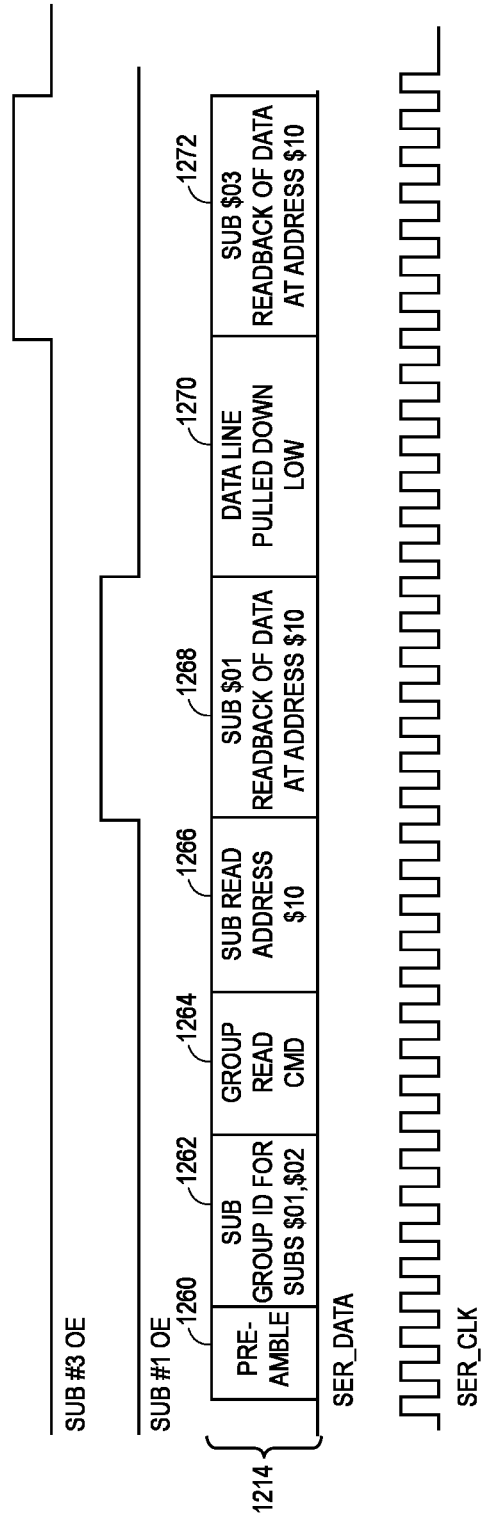
FIG. 12 illustrates a group read command with non-consecutive subordinate device IDs, in accordance with various embodiments.

FIG. 12 illustrates a group read command with non-consecutive subordinate device IDs, in accordance with various embodiments. Embodiments described with respect to FIG. 12 may be referred to as having assignable readback slots.

In embodiments, serial data 1214 sequence may include a preamble 1260, a subordinate group ID 1262, a group read command 1264, a subordinate read address 1266, subordinate device readback data 1268 for subordinate device #1, subordinate device readback data 1272 for subordinate device #3, and a readback gap 1270 where a subordinate device #2 data would have been.

As distinguished from FIG. 11, FIG. 12 shows that some embodiments may suffer one slot of "dead time", degrading the readback efficiency. In other examples, not shown, that include subordinate devices numbers 1-8, were subordinate device #1 and #8 only provided read, embodiments would have six slots of deadtime (#2-#7).

To address this issue, in embodiments, a simple readback time slot mapping register may be added (not shown), such that the readback slot for each subordinate device can be re-programmed, for example, in firmware before the readback commences. The default value of this readback register may be the subordinate device ID #, to mimic the originally proposed readback method. Example values for this register is shown in FIG. 13, along with another register that could be used to optionally define the readback time slot length, if the command protocol does not support a byte count field to indicate the number of bytes to be read. In embodiments, this time slot # register, when zero, may cause the subordinate device to not respond to a group read. The default value of this readback time slot register may also be zero, such that group read is disabled until initially configured by the Main device.

FIG. 13 illustrates registers to provide more precise control of subordinate device readback time slot, in accordance with various embodiments.

Using these registers, the readback time slot dead zone can be avoided such that the timing in FIG. 11 would also apply to a readback from subordinate device #1 and subordinate device #3. Specifically, the main device would program the readback time slot # for subordinate device #3 to a value of 2, rather than use the default value of 3.

Figure 14:
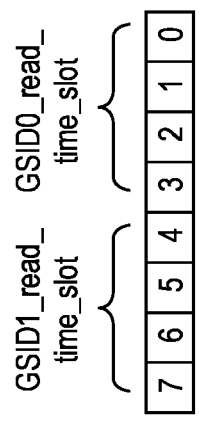
FIG. 14 illustrates a group read readback configuration register, in accordance with various embodiments.

FIG. 14 illustrates a group read readback configuration register, in accordance with various embodiments. It shows how one device could belong to two different groups, GSID0 and GSID1, and could have different readback time slots for each group.

Group Read embodiments described above may assumed the same start address for each subordinate device being read (Sub Register Address in FIG. 9). This is not a limitation in most cases, as most system developers may use devices from the same vendor when multiple instances of the same function is called for. For example, in a wireless 3GPP 5G device with 4×4 MIMO support, there would be four Radio Frequency (RF) power amplifiers (PAs) for a given band, and all would be from the same vendor. In some cases, however, it may be desirable to use group read to read a certain # of bytes from different devices, but with different starting addresses for each. For example, there could be four PAs from vendor A for one RF band, and another four PAs from vendor B for another band. If both bands are being used, then we may want to read temperature from all 8 devices with one Group Read command: the four devices from Vendor A having address A1 for temperature, the other four from Vendor B with address A2 for temperature.

Figure 15:
FIG. 15 illustrates a group read readback configuration for other registers, in accordance with various embodiments.

FIG. 15 illustrates a group read readback configuration for other registers, in accordance with various embodiments.

In embodiments, each subordinate device may have an address offset for the Group Read. The bus main device would configure these offsets in advance of using the Group Read for devices from two different vendors. In the example above, a pre-configure may be sent to the Vendor A devices to have address offset=0000, and the Vendor B devices would have address offset=A2–A1. In the Group Read command, (as in FIG. 9), the address A1 would be sent in the Sub Register Address field. The Vendor A devices would return data starting at address A1, and the Vendor B devices would return data starting at address A1+(A2–A1)=A2. For flexibility, the address offset can be a 2$s$ complement value, and the address offset addition would also be 2$s$ complement.

FIG. 16 illustrates a group read readback alternate proposal based upon logical pointer mapping, in accordance with various embodiments.

In embodiments, pre-defined virtual addresses (pointers) may be used and the subordinate devices may translate these virtual addresses to the actual physical device address. In embodiments, the Group Read command would send the pointer address in the Sub Register Address field 966 in FIG. 9. In embodiments, no address offset scheme is required. Thus, address $02 may be used in the Sub Register Address field, the vendor A devices would translate this to address A1, and the Vendor B devices would translate it to address A2.

Embodiments may be extended to cover a serial bus with multiple data lanes (e.g., two or four data lines), and is orthogonal to the proposed group read. During each subordinate device's read time slot, it would drive its data onto multiple data lines rather than a single data line.

Benefits of the embodiments—There are multiple benefits of implementing these procedures. Some of the benefits will now be discussed.

Reduced readback time. As shown in FIG. 4, for four subordinate devices, embodiments can read the same register from four subordinate devices in 51 clocks with Group Read, and 100 clocks using four separate reads. In embodiments, the parameter sizes are based more or less on MIPI RFFE 3.0 specification. In general, the savings in # of clocks is:

Savings=(Num_Subordinates)*(Preamble+Subordinate_ID+Command_size+Address_width+Protocol_delay+Data_size)−[(Preamble+Subordinate_ID+Command_size+Address_width+Protocol_delay)±(Num_Subordin ates)

*Data_size]=(Num_Subordinates−1)*(Preamble+Subordinate_ID+Command_size+Address_width+Protocol_delay).

Therefore, the savings increases with the number of subordinate devices being read.

Reduced # of serial transactions. As any RF firmware engineer can attest, fewer commands being sent provides more timing margin and less chance for real-time errors, i.e., commands being scheduled too late.

Figure 18:
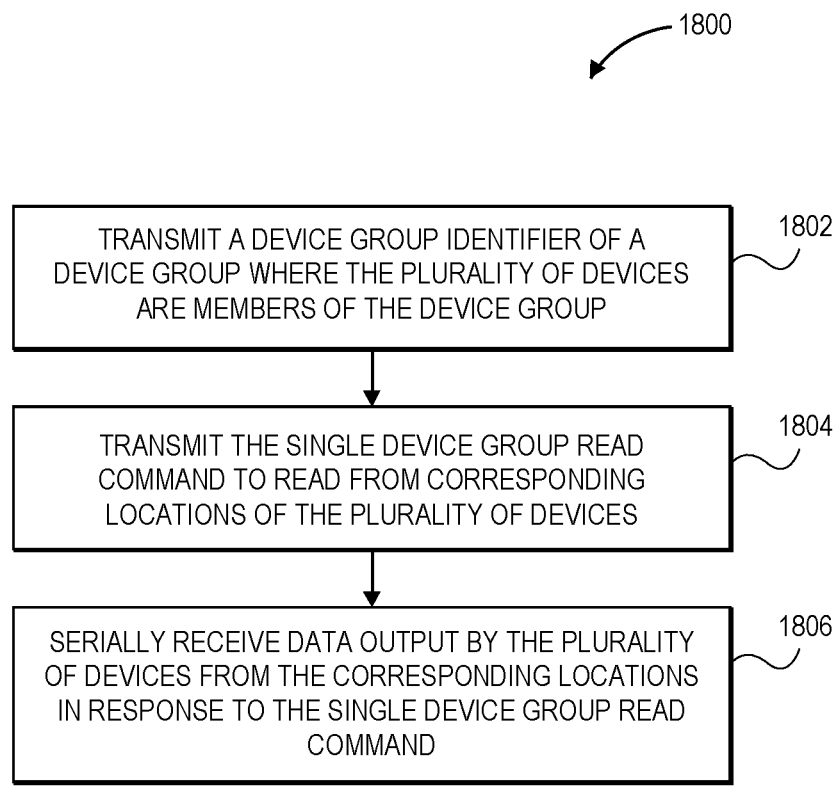
FIG. 18 illustrates a process for performing a multi-device read protocol to read from a plurality of devices coupled to a serial bus using a single device group read command, in accordance with various embodiments.

FIG. 17 illustrates a group read performance table, in accordance with various embodiments. As shown, a number of examples are given for the performance of legacy implementations compared to performance of embodiments described herein, for various number of devices and various number of bytes read per device. As shown, embodiments as described herein may have anywhere from a 31% to a 58% decrease in the number of required cycle counts as compared to legacy implementations FIG. 18 illustrates a process for performing a multi-device read protocol to read from a plurality of devices coupled to a serial bus using a single group read command issued by a device, in accordance with various embodiments. In embodiments, process 1800 may be performed by any of the systems, apparatus, devices, techniques, or modules described herein with respect to FIGS. 1-17. In particular, process 1800 may be performed by a protocol controller coupled to a transmitter and/or receiver assembly that is coupled with a serial bus. In embodiments, the protocol controller may perform a multi-device read protocol to read from a plurality of devices coupled to the serial bus using a single device group read command. In embodiments, the protocol controller may be a part of a main device, such as device 101 of FIG. 1. In embodiments, the plurality of devices may be similar to subordinate devices 102, 103 of FIG. 1.

At block 1802, the process may transmit a device group identifier of a device group where the plurality of devices are members of the device group. In embodiments, the transmission of a device group identifier may be found at least with respect to FIGS. 7 and 9-16.

At block 1804, the process may further include to transmit the single device group read command to read from corresponding locations of the plurality of devices.

At block 1806, the process may further include to serially receive data output by the plurality of devices from the corresponding locations in response to the single device group read command.

Figure 19:
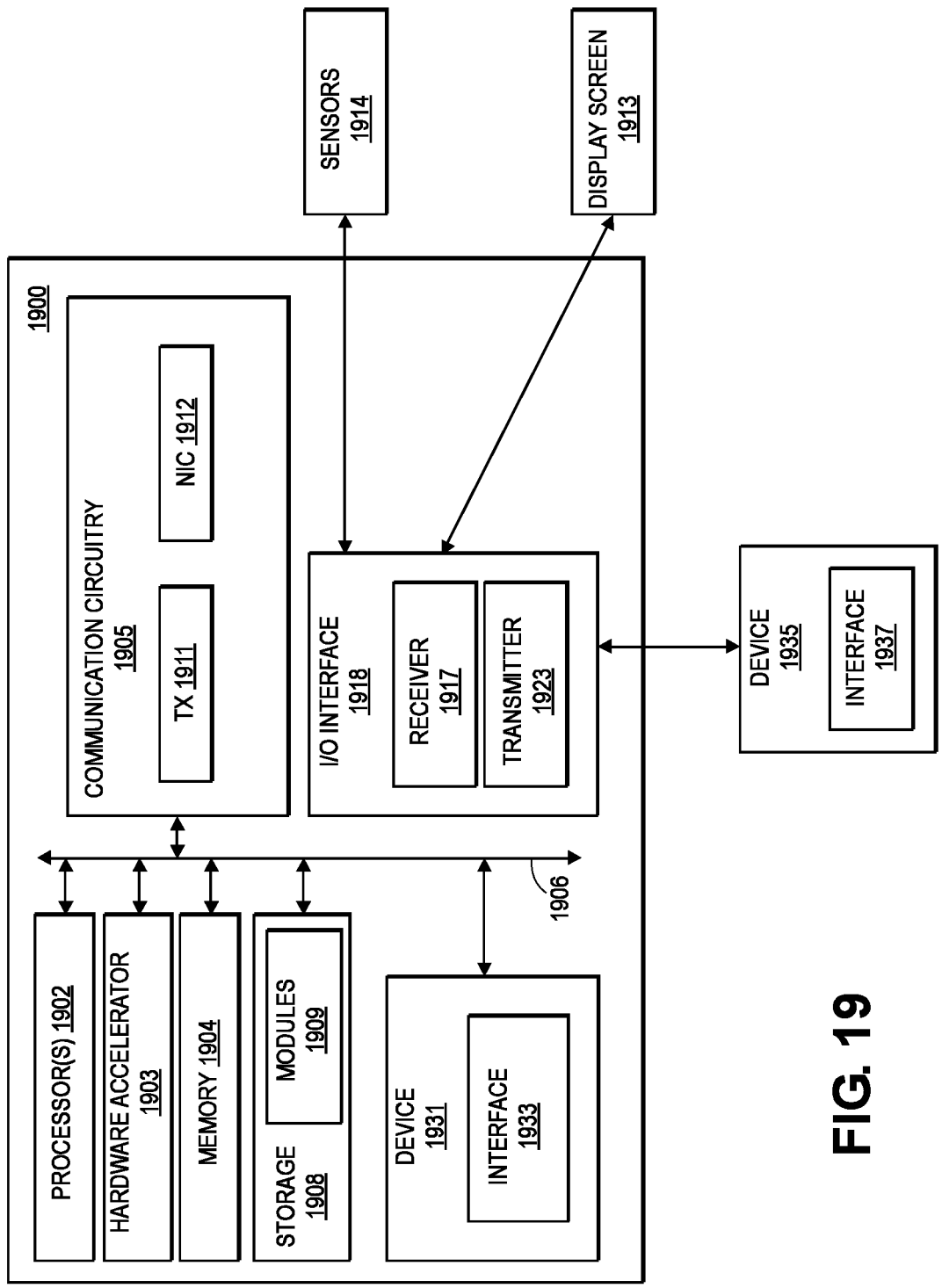
FIG. 19 illustrates an example device suitable for use to practice various aspects of the present disclosure, in accordance with various embodiments.

FIG. 19 illustrates an example device suitable for use to practice various aspects of the present disclosure, in accordance with various embodiments. The device 1900 may be used to implement functions of the apparatus 100. As shown, the device 1900 may include one or more processors 1902, each having one or more processor cores, or and optionally, a hardware accelerator 1903 (which may be an ASIC or a FPGA). In alternate embodiments, the hardware accelerator 1903 may be part of processor 1902, or integrated together on a SOC. Additionally, the device 1900 may include a memory 1904, which may be any one of a number of known persistent storage medium, and a data storage circuitry 1908 including modules 1909, which may include a protocol controller. In addition, the 1900 may include an I/O interface 1918, coupled to one or more sensors 1914, and a display screen 1913.

The I/O interface 1918 may include a transmitter 1923 and a receiver 1917. Furthermore, the device 1900 may include communication circuitry 1905 including a transceiver (Tx) 1911, and network interface controller (NIC) 1912. The elements may be coupled to each other via system bus 1906, which may represent one or more buses. In the case of multiple buses, they may be bridged by one or more bus bridges (not shown). A device 1931 may be coupled to the system bus 1906, and a device 1935 may be coupled to a communication bus 1939. The device 1931 may include an interface 1933, and the device 1935 may include an interface 1937. In embodiments, the communication bus 1906 or the communication bus 1939 may be an example of the communication bus 105 as shown in FIG. 1.

In embodiments, the processor(s) 1902 (also referred to as "processor circuitry 1902") may be one or more processing elements configured to perform basic arithmetical, logical, and input/output operations by carrying out instructions. Processor circuitry 1902 may be implemented as a standalone system/device/package or as part of an existing system/device/package. The processor circuitry 1902 may be one or more microprocessors, one or more single-core processors, one or more multi-core processors, one or more multithreaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 1902 may be a part of a SoC in which the processor circuitry 1902 and other components discussed herein are formed into a single IC or a single package. As examples, the processor circuitry 1902 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm snapdragon® processor(s); Samsung Exynos® processor(s); and/or the like.

In embodiments, the processor circuitry 1902 may include a sensor hub, which may act as a coprocessor by processing data obtained from the one or more sensors 1914. The sensor hub may include circuitry configured to integrate data obtained from each of the one or more sensors 1914 by performing arithmetical, logical, and input/output operations. In embodiments, the sensor hub may capable of timestamping obtained sensor data, providing sensor data to the processor circuitry 1902 in response to a query for such data, buffering sensor data, continuously streaming sensor data to the processor circuitry 1902 including independent streams for each sensor of the one or more sensors 1914, reporting sensor data based upon predefined thresholds or conditions/triggers, and/or other like data processing functions.

In embodiments, the memory 1904 (also referred to as "memory circuitry 1904" or the like) may be circuitry configured to store data or logic for operating the computer device 1900. The memory circuitry 1904 may include number of memory devices may be used to provide for a given amount of system memory. As examples, the memory circuitry 1904 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package, dual inline memory modules (DIMMs) such as microDIMMs or Mini-DIMMs, and/or any other like memory devices. To provide for persistent storage of information such as data, applications, operating systems and so forth, the memory circuitry 1904 may include one or more mass-storage devices, such as a solid state disk drive (SSDD); flash memory cards, such as SD cards, microSD cards, xD picture cards, and the like, and USB flash drives; on-die memory or registers associated with the processor circuitry 1902 (for example, in low power implementations); a micro hard disk drive (HDD); three dimensional cross-point (3D XPOINT) memories from Intel® and Micron®, etc.

Where FPDs are used, the processor circuitry 1902 and memory circuitry 1904 (and/or data storage circuitry 1908) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 1902 to implement various logic functions. The memory cells may include any combination of various levels of memory/storage including, but not limited to, EPROM, EEPROM, flash memory, SRAM, anti-fuses, etc.

In embodiments, the data storage circuitry 1908 (also referred to as "storage circuitry 1908" or the like), with shared or respective controllers, may provide for persistent storage of information such as modules 1909, operating systems, etc. The data storage circuitry 1908 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 1902; hard disk drives (HDDs); micro HDDs; resistance change memories; phase change memories; holographic memories; or chemical memories; among others. As shown, the data storage circuitry 1908 is included in the computer device 1900; however, in other embodiments, the data storage circuitry 1908 may be implemented as one or more devices separated from the other elements of computer device 1900.

In some embodiments, the data storage circuitry 1908 may include an operating system (OS) (not shown), which may be a general purpose operating system or an operating system specifically written for and tailored to the computer device 1900. The OS may include one or more drivers, libraries, and/or application programming interfaces (APIs), which provide program code and/or software components for modules 1909 and/or control system configurations to control and/or obtain/process data from the one or more sensors 1914.

The modules 1909 may be software modules/components used to perform various functions of the computer device 1900 and/or to carry out functions of the example embodiments discussed herein. In embodiments where the processor circuitry 1902 and memory circuitry 1904 includes hardware accelerators (e.g., FPGA cells, the hardware accelerator 1903) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 1909 may comprise logic for the corresponding entities discussed with regard to the display screen 1913, the transmitter 1923, and the receiver 1917.

The components of computer device 1900 may communicate with one another over the bus 1906. The bus 1906 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the bus 1906 may be a controller area network (CAN) bus system, a Time-Trigger Protocol (TTP) system, or a FlexRay system, which may allow various devices (e.g., the one or more sensors 1914, etc.) to communicate with one another using messages or frames.

The communications circuitry 1905 may include circuitry for communicating with a wireless network or wired network. For example, the communication circuitry 1905 may include transceiver (Tx) 1911 and network interface controller (NIC) 1912. Communications circuitry 1905 may include one or more processors (e.g., baseband processors, modems, etc.) that are dedicated to a particular wireless communication protocol.

NIC 1912 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 1912 may be included to allow connect to a second network (not shown) or other devices, for example, a first NIC 1912 providing communications to the network over Ethernet, and a second NIC 1912 providing communications to other devices over another type of network, such as a personal area network (PAN) including a personal computer (PC) device. In some embodiments, the various components of the device 1900, such as the one or more sensors 1914, etc. may be connected to the processor(s) 1902 via the NIC 1912 as discussed above rather than via the I/O circuitry 1918 as discussed infra.

The Tx 1911 may include one or more radios to wirelessly communicate with a network and/or other devices. The Tx 1911 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 1900. In some embodiments, the various components of the device 1900, such as the one or more sensors 1914, etc. may be connected to the device 1900 via the Tx 1911 as discussed above rather than via the I/O circuitry 1918 as discussed infra. In one example, the one or more sensors 1914 may be coupled with device 1900 via a short range communication protocol.

The Tx1911 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), WITS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 1918 may include circuitry, such as an external expansion bus (e.g., Universal Serial Bus (USB), FireWire, Thunderbolt, PCI/PCIe/PCIx, etc.), used to connect computer device 1900 with external components/devices, such as one or more sensors 1914, etc. I/O interface circuitry 1918 may include any suitable interface controllers and connectors to interconnect one or more of the processor circuitry 1902, memory circuitry 1904, data storage circuitry 1908, communication circuitry 1905, and the other components of computer device 1900. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 1906), ports, slots, jumpers, interconnect modules, receptacles, modular connectors, etc. The I/O circuitry 1918 may couple the device 1900 with the one or more sensors 1914, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 1914 may be any device configured to detect events or environmental changes, convert the detected events into electrical signals and/or digital data, and transmit/send the signals/data to the computer device 1900. Some of the one or more sensors 1914 may be sensors used for providing computer-generated sensory inputs. Some of the one or more sensors 1914 may be sensors used for motion and/or object detection. Examples of such one or more sensors 1914 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 1914 may include a lens-less image capture mechanism comprising an array of aperture elements, wherein light passing through the array of aperture elements define the pixels of an image. In embodiments, the motion detection one or more sensors 1914 may be coupled with or associated with light generating devices, for example, one or more infrared projectors to project a grid of infrared light onto a scene, where an infrared camera may record reflected infrared light to compute depth information.

Some of the one or more sensors 1914 may be used for position and/or orientation detection, ambient/environmental condition detection, and the like. Examples of such one or more sensors 1914 may include, inter alia, microelectromechanical systems (MEMS) with piezoelectric, piezoresistive and/or capacitive components, which may be used to determine environmental conditions or location information related to the computer device 1900. In embodiments, the MEMS may include 3-axis accelerometers, 3-axis gyroscopes, and/or magnetometers. In some embodiments, the one or more sensors 1914 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 1902, the hardware accelerator 1903, the memory 1904, the data storage circuitry 1908 including the modules 1909, the input/output interface 1918, the one or more sensors 1914, the communication circuitry 1905 including the Tx 1911, the NIC 1912, the system bus 1906, the communication bus 1939, the device 1931, the device 1935, may perform its conventional functions known in the art. In addition, they may be employed to store and host execution of programming instructions implementing the operations associated with multi-device serial read for communication buses as described in connection with FIGS. 1-18, and/or other functions that provides the capability of the embodiments described in the current disclosure. The various elements may be implemented by assembler instructions supported by processor(s) 1902 or high-level languages, such as, for example, C, that can be compiled into such instructions. Operations associated with the device 1900 not implemented in software may be implemented in hardware, e.g., via hardware accelerator 1903.

The number, capability and/or capacity of these elements 1902-1939 may vary, depending on the number of other devices the device 1900 is configured to support. Otherwise, the constitutions of elements 1902-1939 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 20:
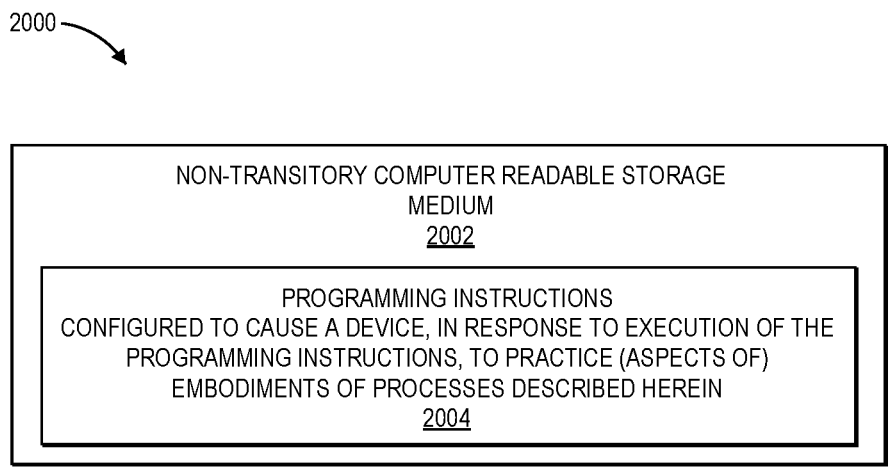
FIG. 20 illustrates a storage medium having instructions for practicing methods described with references to FIGS. 1-19, in accordance with various embodiments.

Furthermore, the present disclosure may take the form of a computer program product embodied in any tangible or non-transitory medium of expression having computer-usable program code embodied in the medium. FIG. 20 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 2002 may include a number of programming instructions 2004. Programming instructions 2004 may be configured to enable a device, e.g., device 2000, in response to execution of the programming instructions, to perform, e.g., various operations associated with multi-device serial read for communication buses, as shown in FIGS. 1-18.

In alternate embodiments, programming instructions 2004 may be disposed on multiple computer-readable non-transitory storage media 2002 instead. In alternate embodiments, programming instructions 2004 may be disposed on computer-readable transitory storage media 2002, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

EXAMPLES

Example 1 may include an apparatus comprising: means for managing various operations associated with multi-device serial read for communication buses.

Example 2 may include the apparatus of example 1 and/or some other examples herein, wherein the communication buses include a SPI bus, an I3C bus, or a MIPI RFFE bus.

Example 3 may include a serial data protocol interconnecting a main device, or plurality of main devices, to a multiplicity of subordinate devices, such that a Group Readback transaction of data from multiple subordinate devices can be performed with a single bus transaction.

Example 4 may include the protocol of example 3 and/or some other examples herein, wherein the order of data readback from the multiple subordinate devices is defined by their subordinate device addresses.

Example 5 may include the protocol of example 3 and/or some other examples herein, wherein the order of readback for the subordinate devices is defined by subordinate device data registers indicating the readback time slot.

Example 6 may include the protocol of example 3 and/or some other examples herein, wherein the readback data can be driven onto a single, or plurality, of data lines by the subordinate devices.

Example 7 may include the protocol of example 3 and/or some other examples herein, wherein the readback data can be data from a single subordinate device data registers, or multiple subordinate device data registers read out sequentially or in an interleaved fashion.

Example Z01 may include an apparatus comprising means to perform one or more elements of a method described in or related to any of examples herein, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples herein, or any other method or process described herein.

Example Z03 may include an apparatus comprising logic, modules, or circuitry to perform one or more elements of a method described in or related to any of examples herein, or any other method or process described herein.

Example Z04 may include a method, technique, or process as described in or related to any of examples herein, or portions or parts thereof.

Example Z05 may include an apparatus comprising: one or more processors and one or more computer readable media comprising instructions that, when executed by the one or more processors, cause the one or more processors to perform the method, techniques, or process as described in or related to any of examples herein, or portions thereof.

Example Z06 may include a signal as described in or related to any of examples herein, or portions or parts thereof.

Example 1 is an apparatus comprising: a transmitter and receiver assembly to couple the apparatus to a serial bus; and a protocol controller coupled to the transmitter and receiver assembly to control the transmitter and receiver assembly to perform a multi-device read protocol to read from a plurality of devices coupled to the serial bus using a single device group read command, including to cause the transmitter and receiver assembly to: transmit a device group identifier of a device group where the plurality of devices are members of the device group; transmit the single device group read command to read from corresponding locations of the plurality of devices; and serially receive data output by the plurality of devices from the corresponding locations in response to the single device group read command.

Example 2 may include the apparatus of example 1, wherein the device group identifier is based upon a data register of the plurality of devices.

Example 3 may include the apparatus of example 2, wherein the data register is a selected one of: a temperature data register, a power detector register, or an interrupt status register.

Example 4 may include the apparatus of example 1, wherein an order of the data output by the plurality of devices is outputted based upon device identifiers, respectively, of the plurality of devices.

Example 5 may include the apparatus of example 1, wherein to serially receive the data output by the plurality of devices further includes to serially receive the data output by the plurality of devices with no timing gaps between the respective data output.

Example 6 may include the apparatus of example 1, wherein to serially receive the data output by the plurality of devices further includes to serially receive the data output by the plurality of devices separated by a timing gap.

Example 7 may include the apparatus of example 1, wherein to serially receive the data output by the plurality of devices further includes to serially received the data output based upon a value of a logical variable, respectively, of the plurality of devices, wherein the plurality of devices have different address maps.

Example 8 may include the apparatus of example 1, wherein an order of the data output by the plurality of devices is based upon time-slot registers.

Example 9 may include the apparatus of example 1, wherein the apparatus is a main device, and the plurality of devices are subordinate devices.

Example 10 may include the apparatus of any one of examples 1-9, wherein the protocol is a selected one of: an I2C protocol, a MIPI RFFE protocol, or an I3C protocol.

Example 11 is a system comprising: a serial bus; a plurality of subordinate devices coupled with the serial bus; and a main device including: a transmitter and receiver assembly to couple the apparatus to the serial bus; a protocol controller coupled to the transmitter and receiver assembly to control the transmitter and receiver assembly to perform a multi-device read protocol to read from a plurality of devices coupled to the serial bus using a single device group read command, including to cause the transmitter and receiver assembly to: transmit a device group identifier of a device group where the plurality of devices are members of the device group; transmit the single device group read command to read from corresponding locations of the plurality of devices; and serially receive data output by the plurality of devices from the corresponding locations in response to the single device group read command.

Example 12 may include the system of example 11, wherein the device group identifier is based upon a data register of the plurality of subordinate devices.

Example 13 may include the system of example 12, wherein the data register is a selected one of: a temperature data register, a power detector register, or an interrupt status register.

Example 14 may include the system of example 11, wherein an order of the data output by the plurality of devices is outputted based upon addresses, respectively, of the plurality of devices.

Example 15 may include the system of example 11, wherein to serially receive the data output by the plurality of devices further includes to serially receive the data output by the plurality of devices with no timing gaps between the respective data output.

Example 16 may include the system of any one of examples 11-15, wherein to serially receive the data output by the plurality of devices further includes to serially receive the data output by the plurality of devices separated, respectively, by a timing gap.

Example 17 may include the apparatus of example 16, wherein the timing gap is one bit clock period.

Example 18 is a non-transitory computer readable medium including code, when executed on a main device, to cause the device to operate a protocol controller coupled to a transmitter and a receiver assembly coupled to a serial bus to perform a multi-device read protocol to read from a plurality of subordinate devices coupled to the serial bus using a single device group read command, to cause the transmitter and receiver assembly to: transmit, by the main device, a device group identifier of a device group where the plurality of subordinate devices are members of the device group; transmit, by the main device, the single device group read command to read from corresponding locations of the plurality of subordinate devices; and serially receive, by the main device, data output by the plurality of subordinate devices from the corresponding locations in response to the single device group read command.

Example 19 may include the non-transitory computer readable medium of example 18, wherein an order of the data output by the plurality of subordinate devices is outputted based upon addresses, respectively, of the plurality of devices.

Example 20 may include the non-transitory computer readable medium of any one of examples 18-19, wherein to serially receive the data output by the plurality of subordinate devices further includes to serially receive the data output by the plurality of subordinate devices with a selected one of: no timing gaps between each of the respective data output, or a timing gap of a one bit clock period between each of the respective data output.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. An apparatus comprising:
a transmitter and receiver assembly to couple the apparatus to a serial bus;
a protocol controller coupled to the transmitter and receiver assembly to control the transmitter and receiver assembly to perform a multi-device read protocol to read from a plurality of devices coupled to the serial bus using a single device group read command, including to cause the transmitter and receiver assembly to:
transmit a device group identifier of a device group where the plurality of devices are members of the device group;
transmit the single device group read command to read from corresponding locations of the plurality of devices; and
serially receive data output by the plurality of devices from the corresponding locations in response to the single device group read command.

2. The apparatus of claim 1, wherein the device group identifier is based upon a data register of the plurality of devices.

3. The apparatus of claim 2, wherein the data register is a selected one of: a temperature data register, a power detector register, or an interrupt status register.

4. The apparatus of claim 1, wherein an order of the data output by the plurality of devices is outputted based upon device identifiers, respectively, of the plurality of devices.

5. The apparatus of claim 1, wherein to serially receive the data output by the plurality of devices further includes to serially receive the data output by the plurality of devices with no timing gaps between the respective data output.

6. The apparatus of claim 1, wherein to serially receive the data output by the plurality of devices further includes to serially receive the data output by the plurality of devices separated by a timing gap.

7. The apparatus of claim 1, wherein to serially receive the data output by the plurality of devices further includes to serially received the data output based upon a value of a logical variable, respectively, of the plurality of devices, wherein the plurality of devices have different address maps.

8. The apparatus of claim 1, wherein an order of the data output by the plurality of devices is based upon time-slot registers.

9. The apparatus of claim 1, wherein the apparatus is a main device, and the plurality of devices are subordinate devices.

10. The apparatus of claim 1, wherein the protocol is a selected one of: an I2C protocol, a MIPI RFFE protocol, or an I3C protocol.

11. A system comprising:
a serial bus;
a plurality of subordinate devices coupled with the serial bus;
a main device including:
a transmitter and receiver assembly to couple the apparatus to the serial bus;
a protocol controller coupled to the transmitter and receiver assembly to control the transmitter and receiver assembly to perform a multi-device read protocol to read from a plurality of devices coupled to the serial bus using a single device group read command, including to cause the transmitter and receiver assembly to:
transmit a device group identifier of a device group where the plurality of devices are members of the device group;
transmit the single device group read command to read from corresponding locations of the plurality of devices; and
serially receive data output by the plurality of devices from the corresponding locations in response to the single device group read command.

12. System of claim 11, wherein the device group identifier is based upon a data register of the plurality of subordinate devices.

13. The system of claim 12, wherein the data register is a selected one of: a temperature data register, a power detector register, or an interrupt status register.

14. The system of claim 11, wherein an order of the data output by the plurality of devices is outputted based upon addresses, respectively, of the plurality of devices.

15. The system of claim 11, wherein to serially receive the data output by the plurality of devices further includes to serially receive the data output by the plurality of devices with no timing gaps between the respective data output.

16. The system of claim 11, wherein to serially receive the data output by the plurality of devices further includes to serially receive the data output by the plurality of devices separated, respectively, by a timing gap.

17. The apparatus of claim 16, wherein the timing gap is one bit clock period.

18. A non-transitory computer readable medium including code, when executed on a main device, to cause the device to operate a protocol controller coupled to a transmitter and a receiver assembly coupled to a serial bus to perform a multi-device read protocol to read from a plurality of subordinate devices coupled to the serial bus using a single device group read command, to cause the transmitter and receiver assembly to:
transmit, by the main device, a device group identifier of a device group where the plurality of subordinate devices are members of the device group;
transmit, by the main device, the single device group read command to read from corresponding locations of the plurality of subordinate devices; and
serially receive, by the main device, data output by the plurality of subordinate devices from the corresponding locations in response to the single device group read command.

19. The non-transitory computer readable medium of claim 18, wherein an order of the data output by the plurality of subordinate devices is outputted based upon addresses, respectively, of the plurality of devices.

20. The non-transitory computer readable medium of claim 18, wherein to serially receive the data output by the plurality of subordinate devices further includes to serially receive the data output by the plurality of subordinate devices with a selected one of: no timing gaps between each of the respective data output, or a timing gap of a one bit clock period between each of the respective data output.

* * * * *